US007133049B2

(12) United States Patent
Lee et al.

(10) Patent No.: US 7,133,049 B2
(45) Date of Patent: Nov. 7, 2006

(54) APPARATUS AND METHOD FOR DRIVING LIQUID CRYSTAL DISPLAY DEVICE

(75) Inventors: Han Sang Lee, Uiwang-Si (KR); Myung Ho Lee, Uiwang-Si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 221 days.

(21) Appl. No.: 10/964,824

(22) Filed: Oct. 15, 2004

(65) Prior Publication Data

US 2005/0140622 A1 Jun. 30, 2005

(30) Foreign Application Priority Data

Dec. 30, 2003 (KR) ..................... 10-2003-0100825

(51) Int. Cl.

*G09G 5/00* (2006.01)
*G09G 5/10* (2006.01)
*H04N 9/64* (2006.01)
*H04N 5/66* (2006.01)
*G09G 5/30* (2006.01)
*H04N 9/31* (2006.01)

(52) U.S. Cl. ...................... 345/589; 345/204; 345/214; 345/690; 345/77; 348/246; 348/761

(58) Field of Classification Search ................ 345/204, 345/207, 690, 694, 696, 214, 38, 48, 63, 345/72, 77, 84, 87–88, 46, 50; 348/223, 348/225, 227, 228, 242, 245, 246–247, 739, 348/751, 760–761

See application file for complete search history.

(56) References Cited

U.S. PATENT DOCUMENTS

| | | | | |
|---|---|---|---|---|
| 6,947,083 | B1 * | 9/2005 | Nakajima | 348/246 |
| 2002/0080253 | A1 * | 6/2002 | Kim | 348/246 |
| 2003/0151682 | A1 * | 8/2003 | Kokubo et al. | 348/241 |
| 2003/0222861 | A1 * | 12/2003 | Nishikawa et al. | 345/204 |

* cited by examiner

*Primary Examiner*—Wesner Sajous
(74) *Attorney, Agent, or Firm*—McKenna, Long & Aldridge

(57) ABSTRACT

A display device includes a display panel having a plurality of pixels, each pixel including R, G B and W sub-pixels; a color information detecting unit receiving R, G and B sub-pixel video data for each pixel and outputting a detecting signal when one or two of the R, G and B sub-pixel video data are null; a color component determining unit receiving the detecting signals for the entire pixels, operating the detecting signals, comparing the operated detecting signals with at least one reference value, and outputting a control singal; and a light source control unit controlling an amount of a light source according to the control signal.

19 Claims, 3 Drawing Sheets

APPARATUS AND METHOD FOR DRIVING LIQUID CRYSTAL DISPLAY DEVICE

This application claims the benefit of Korean Patent Application No. 2003-100825, filed on Dec. 30, 2003, which is hereby incorporated by reference for all purposes as if fully set forth herein.

BACKGROUND OF THE INVENTION

1. Field of the Invention

The present invention relates to an apparatus and method for driving a display device and, more particularly, to an apparatus and method for driving a liquid crystal display device which improves the brightness of the liquid crystal display device.

2. Discussion of the Related Art

In general, a cathode ray tube (CRT), one of display devices that is being widely used, is mainly used for a monitor for TVs, measuring instruments, information terminals or the like. However, due to its size and weight, the CRT is not widely used for small and light electronic products. Accordingly, in order to replace the CRT, a liquid crystal display (LCD) device has been developed, which has such advantages as small size, lightweight and low-power consumption. Because of these advantages, the demand for the LCD device is continuously increasing.

The LCD device takes advantage of the principles of refractive anisotropy and polarization. By controlling the alignment direction of the liquid crystal molecules, an amount of light passing through the LCD device can be adjusted due to the refractive anisotropy of the liquid crystal molecules. Of various types of LCD devices, an active matrix LCD device is currently most widely used due to its superior picture quality, in which a thin film transistor and a pixel electrode connected to the thin film transistor are arranged in a matrix configuration.

The active matrix LCD device includes a display panel in which a plurality of pixels are arranged in a matrix configuration and a driving part for driving the pixels. The display panel includes a thin film transistor array(TFT) substrate and a color filter(CF) substrate which face each other and are attached to each other with a uniform cell-gap. A liquid crystal layer is provided between the CF substrate and the TFT substrate. A common electrode and a pixel electrode are formed in the display panel and apply an electric field to the liquid crystal layer. Accordingly, when a voltage is applied between the common and pixel electrodes, the liquid crystal molecules of the liquid crystal layer rotates according to the electric field due to the dielectric anisotropy, thereby displaying texts or images.

FIG. 1 is a plan view illustrating a pixel structure of a liquid crystal display device according to a related art.

Referring to FIG. 1, the LCD device includes a plurality of pixels 120 arranged in a matrix configuration on a substrate 110, and each pixel 120 has red, green and blue (R, G and B) sub-pixels. The LCD device having such a construction is not a self-emitting device, so that a back-light is provided at the rear of the substrate 110 to generate white light. The white light generated from the back-light passes through the R, G and B sub-pixels, thereby displaying images. When the white light generated from the back-light passes through the R, G and B sub-pixels, each of the R, G and B sub-pixels transmits an amout of light in a corresponding range of wavelength (wavelength ranges of red, green and blue lights) and absorbs light in other ranges of wavelength. Therefore, the LCD device has a disadvantage in that it has a lower brightness, compared with the CRT. Accordingly, a LCD device having four sub-pixels in one pixel has been recently proposed in order to improve the brightness of the LCD device.

FIG. 2 is a plan view illustrating a pixel structure of a LCD device according to a related art in which one pixel has four sub-pixels. With reference to FIG. 2, the LCD device includes a plurality of pixels 220 arranged in a matrix configuration on a substrate 210. Each pixel further includes red, green, blue and white (R, G, B and W) sub-pixels. The LCD device having the R, G, B and W sub-pixels in one pixel 220 has a higher brightness than the LCD device having the R, G and B sub-pixels in one pixel 120 shown in FIG. 1. This will be described in detail.

When white light generated from a back-light passes through the R, G and B sub-pixels, each of the R, G and B sub-pixels transmits an amount of light in a corresponding range of wavelength (wavelength ranges of red, green and blue lights) and absorbs light in other ranges of wavelength. By controlling the amounts of the transmitted red, green and blue lights, the LCD device determines a color displayed at the pixel 220. At this time, the white W sub-pixel controls the amount of the white light generated from the back-light in accordance with the amounts of the transmitted red, green and blue lights. That is to say, the W sub-pixel improves the brightness of the LCD device by increasing the brightness of the white light in the red, green and blue lights transmitted from the red, green and blue (R, G and B) sub-pixels.

However, when displaying a monochromatic light (red light, green light or blue light) or a mixture of two lights out of red light, green light and blue light at the pixel 220, the LCD device has a lower brightness than the LCD device in which one pixel 120 has the R, G and B sub-pixels. In other words, when displaying a monochromatic light or a mixture of two lights out of the red light, the green light and the blue light at the pixel 220, the transmitted light does not include white light, and thus the W sub-pixel blocks the white light generated from the back-light according to the image information. In addition, assuming that the LCD device of FIG. 1 has the same size and resolution as the LCD device of FIG. 2, a size of each sub-pixel of FIG. 2 (R, G, B and W sub-pixels) is smaller than that of each sub-pixel of FIG. 1 (R, G and B sub-pixels).

As a result, when displaying a monochromatic light or a mixture of two lights at the pixels 220, the W sub-pixel does not transmit white light, and the LCD device having the R, G, B and W sub-pixels in one pixel 220 has a lower aperture ratio than the LCD device having the R, G and B sub-pixels in one pixel. Accordingly, the LCD device haivng the R, G, B and W sub-pixels in one pixel 220 has a lower brightness than the LCD device having the R, G and B sub-pixels in one pixel.

SUMMARY OF THE INVENTION

Accordingly, the present invention is directed to an apparatus and method for driving a liquid crystal display device that substantially obviate one or more of the problems due to limitations and disadvantages of the related art.

Accordingly, an advantage of the present invention is to provide an apparatus and method for driving a display device that improves the brightness of the display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a display device includes a display panel having a plurality of pixels, each pixel including R, G, B and W sub-pixels; a color information detecting unit receiving R, G and B sub-pixel video data for each pixel and outputting first and second signals, wherein the first signal is different from the second signal, and the color information detecting unit outputs the first signal when one or two of the R, G and B sub-pixel video data are null; a color component determining unit counting a number of the first signal, comparing the number of the first signal with at least one reference value, and outputting a control singal; and a light source control unit controlling an amount of a light source according to the control signal.

In another aspect of the present invention, a display device includes a display panel having a plurality of pixels, each pixel including R, G, B and W sub-pixels; a color information detecting unit receiving R, G and B sub-pixel video data for each pixel and outputting a detecting signal when one or two of the R, G and B sub-pixel video data are null; a color component determining unit receiving the detecting signals for the entire pixels, operating the detecting signals, comparing the operated detecting signals with at least one reference value, and outputting a control singal; and a light source control unit controlling an amount of a light source according to the control signal.

In yet another aspect of the present invention, a method for driving a display device having a plurality of pixels, each pixel including R, G, B and W sub-pixels, the method includes receiving R, G and B sub-pixel video data for each pixel and outputting a detecting signal when one or two of the R, G and B sub-pixel video data are null; storing the detecting signals for the entire pixels, operating the detecting signals, comparing the operated detecting signals with at least one reference value, and outputting a control singal; and controlling an amount of a light source according to the control signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
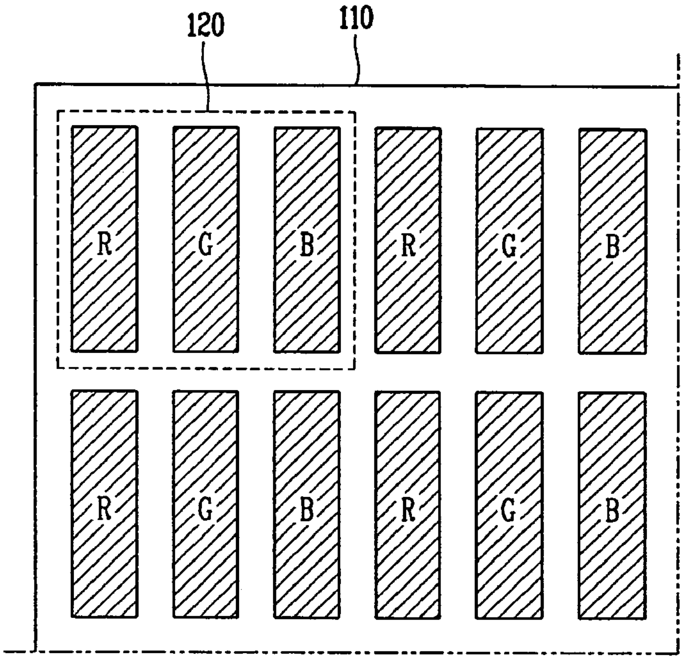
FIG. 1 RELATED ART
FIG. 1 is a plan view illustrating a pixel structure of a liquid crystal display device according to a related art.
Figure 2:
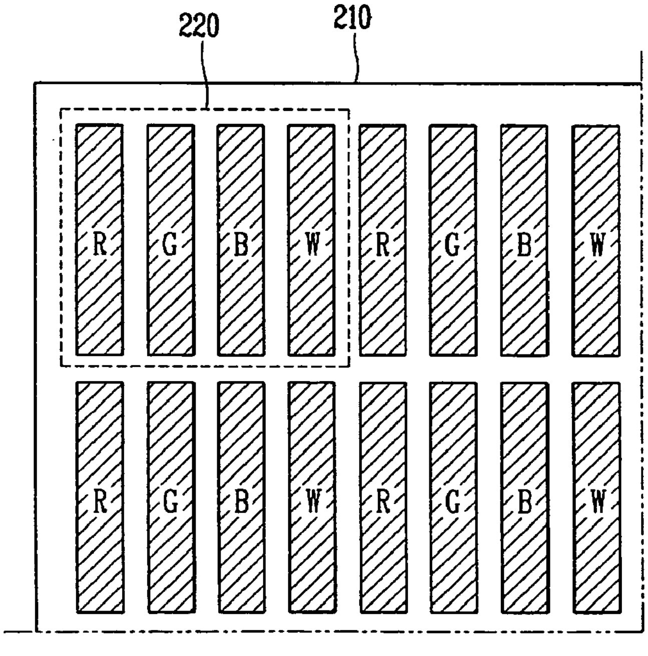
FIG. 2 RELATED ART
FIG. 2 is a plan view illustrating a pixel structure of a liquid crystal display device according to a related art in which one pixel includes four sub-pixels.
Figure 3:
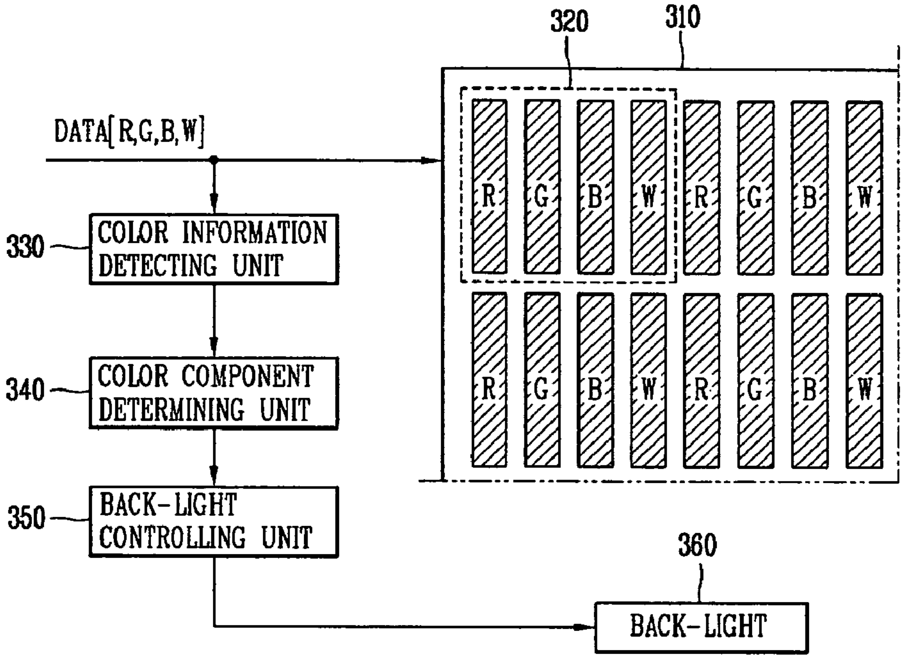
FIG. 3 is an exemplary view illustrating a block construction of a liquid crystal display device according to the present invention.

FIG. 3 is an exemplary view illustrating a block construction of a liquid crystal display device according to the present invention. With reference to FIG. 3, the LCD device includes a plurality of pixels 320 arranged in a matrix configuration on a substrate 310, and each pixel 320 has red, green, blue and white (R, G, B and W) sub-pixels. The LCD device further includes a color information detecting unit 330, a color component determining unit 340 and a back-light controlling unit 350.

The color information detecting unit 330 detects color information of the R, G, B and W sub-pixels from video data (DATA [R, G, B and W]). The color component determining unit 340 extracts data on the number of or a distribution of the pixels that will display a monochromatic light or a mixture of two colors based on the color information of the R, G and B sub-pixels detected from the color information detecting unit 330. Then, the color component determining unit 340 compares the data with at least one reference value, and outputs a signal according to the result of such comparison. The back-light controlling unit 350 controls an amount of back-light generated from a back-light 360 according to the signal outputted from the color component determining unit 340. Although not shown in FIG. 3, the reference values may be stored in a look-up table(LUT).

In the LCD device having such a construction according to the present invention, each pixel 320 has the R, G, B and W sub-pixels. When the white light generated from the back-light 360 passes through the R, G and B sub-pixels, each of the R, G and B sub-pixels transmits an amout of light in a corresponding range of wavelength (wavelength ranges of red, green and blue lights) and absorbs light in other ranges of wavelength. By controlling the amounts of the transmitted red, green and blue lights, the LCD device determines a color to be displayed at the pixels 320. At this time, the white W sub-pixel controls an amount of the transmitted white light generated from the back-light 360 in accordanced with the white video data (DATA [W]), which is dependent upon the amounts of the transmitted red, green and blue lights. That is to say, the W sub-pixel improves the brightness of the LCD device by increasing the brightness of the white light in the red, green and blue lights transmitted from the red, green and blue (R, G and B) sub-pixels.

Meanwhile, when displaying a monochromatic light (red light, green light or blue light) or a mixture of two lights out of red light, green light and blue light at the pixel 320, the transmitted light does not include white light, and thus the W sub-pixel blocks the white light generated from the back-light 360 according to the white video data (DATA [W]).

Figure 4:
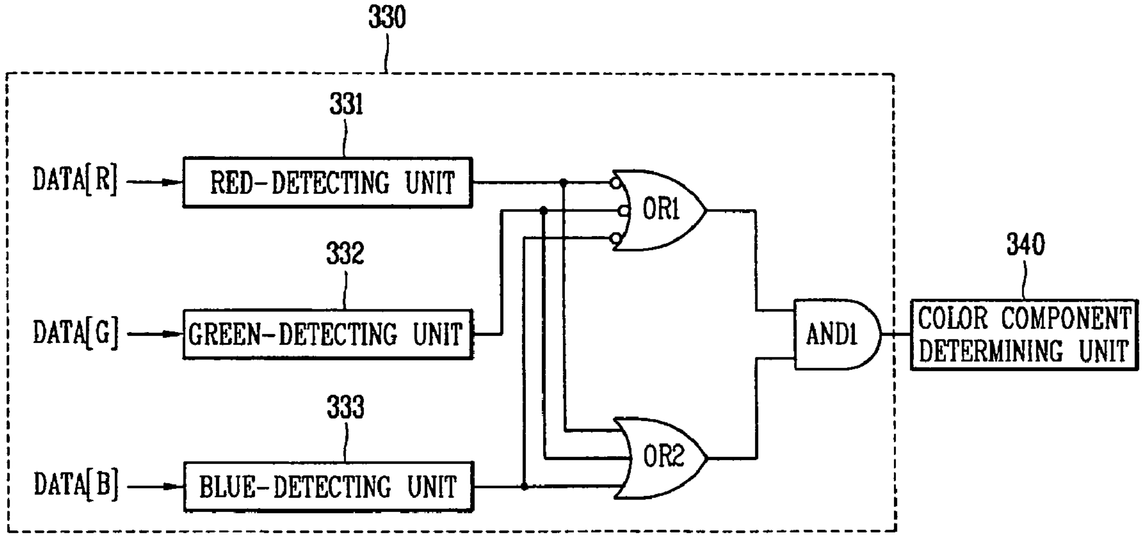
FIG. 4 is an exemplary view illustrating a construction of the color information detecting unit in FIG. 3 in detail.

FIG. 4 is an exemplary view illustrating a construction of the color information detecting unit 330 in FIG. 3 in detail. With reference to FIG. 4, the color information detecting unit 330 includes a red detecting unit 331 for detecting whether the red video data (DATA[R]) has a value or null, a green detecting unit 332 for detecting whether the green video data (DATA[G]) has a value or null, and a blue detecting unit 333 for detecting whether the blue video data (DATA[B]) has a value or null. The color information detecting unit 330 further includes a first OR gate OR1, a second OR gate OR2 and a first AND gate AND 1. The first OR gate OR1 receives the reversed signals outputted from the red detecting unit 331, the green detecting unit 332 and the blue detecting unit 333, and performs OR-function. That is, the first OR gate OR1 is operated as NOR gate. Similarly, the second OR gate OR2 reveives the signals outputted from the red detecting unit 331, the green detecting unit 332 and the blue detecting unit 333, and performs OR-function. The first AND gate AND1 receives the outputted signals of the first and second OR gates (OR1 and OR2), performs AND-function, and outputs a signal to the color component determining unit 340. In other words, the red detecting unit 331, the green detecting unit 332 and the blue detecting unit 333 output signals when the pixel 320 will display a color that requires a red color component, a green color component, and a blue color component, respectively, from the video data.

For example, the red detecting unit 331 outputs a LOW signal when a red color component is not required for the pixel 320 according to the red video data (DATA[R]), and outputs a HIGH signal when a red color componet is required for the pixel 320 according to the red video data (DATA[R]). The green detecting unit 332 outputs a LOW signal when a green color component is not required for the pixel 320 according to the green video data (DATA[G]), and outputs a HIGH signal when a green color componet is required for the pixel 320 according to the green video data (DATA[G]). The blue detecting unit 333 outputs a LOW signal when a blue color component is not required for the pixel 320 according to the blue video data (DATA[B]), and outputs a HIGH signal when a blue color componet is required for the pixel 320 according to the blue video data (DATA[B])

The first OR gate OR1 receives the reversed signals of the red detecting unit 331, the green detecting unit 332 and the blue detecting unit 333, and performs OR-function. That is, the first OR gate OR1 outputs a HIGH signal when at least one of the red, green and blue video data(DATA[R,G and B]) is null or when all of the red, green and blue video data (DATA[R,G and B]) are null, and outputs a LOW signal when none of the red, green and blue is null. The second OR gate OR2 reveives the signals outputted from the red detecting unit 331, the green detecting unit 332 and the blue detecting unit 333, and performs OR-function. That is, the second OR gate OR2 outputs a LOW signal when none of the red, green and blue video data has a value, and outputs a HIGH signal when at least one of the red, green and blue video data has a value.

The first AND gate AND 1 receives the outputted signals of the first and second OR gates (OR1 and OR2), performs AND-function, and outputs a signal to the color component determining unit 340. That is, the first AND gate AND 1 outputs a LOW signal when none of the red, green and blue video data has a value, or when all of the red, green and blue video data have a value, and outputs a HIGH signal when one or two of the red, green and blue video data has a value. In other words, the first AND gate AND1 outputs a HIGH signal when the pixel 320 having the four sub-pixels will display a color that requires a single color component or two color components.

As a result, the color information detecting unit 330 recevies the video data (DATA [R,G and B]) and performs Exclusive-OR(XOR) function. The color information detecting unit 330 outputs a LOW signal when all of the red, green and blue video data are null or when none of the red, green and blue video data are null, and outputs a HIGH signal when the pixel 320 having the four sub-pixels will display a color that requires a single color component or two color components.

Figure 5:
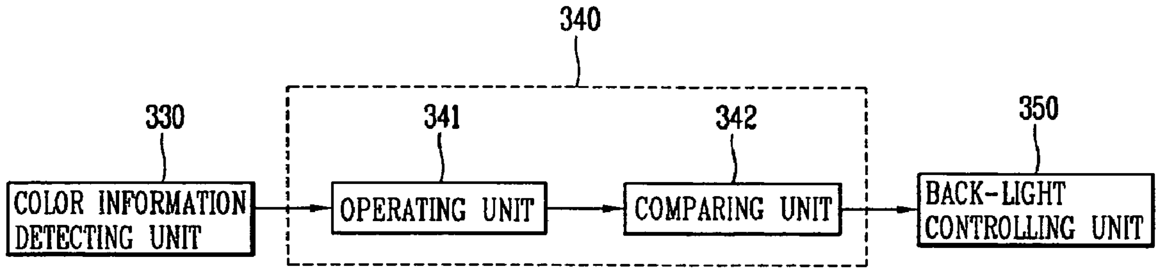
FIG. 5 is an exemplary view illustrating a construction of the color component determining unit in FIG. 3 in detail.

FIG. 5 is an exemplary view illustrating a construction of the color component determining unit 340 in FIG. 3 in detail. With reference to FIG. 5, the color component determining unit 340 includes an operating unit 341 for receiving output signals of the color information detecting unit 330 and extracting data on the number of or a distribution of the pixels that will display a monochromatic light or a mixture of two lights, and a comparing unit 342 for comparing the data with at least one reference value and outputting a control signal to the back-light controlling unit 350. Accordingly, the color component determining unit 340 operates the output signals of the color information detecting unit 330, extracts data on the number of or a distribution of the pixels that will display a monochromatic light or a mixture of two lights for the entire image, compares the data with the reference value, and outputs the control signal according to a result of such a comparison to the back-light controlling unit 350 through the comparing unit 342. The entire image may be image of one or more frames.

The back-light controlling unit 350 controls an amount of light of the back-light 360 according to the control signal outputted from the color component determining unit 340. At this time, the back-light controlling unit 350 carries out pulse operated by pulse width modulation (PWM) and thus can control an amount of back-light generated from the back-light 360.

As a result, when the number or a distribution of the pixels 320 that will display a monochromatic light (red light, green light or blue light) or a mixture of two lights out of red light, green light and blue light is, for example, greater than the reference value, the color component determining unit 340 outputs the control signal to the back-light controlling unit 350 so as to increase an amount of back-light generated from the back-light 360, thereby increasing the brightness of the LCD device. On the contrary, the number of the pixels 320 or a distribution of the pixels 320 that will display a monochromatic light (red light, green light or blue light) or a mixture of two lights out of red light, green light and blue light is less than the reference value, the color component determining unit 340 outputs the control signal to the back-light controlling unit 350 so as to decrease an amount of back-light generated from the back-light 360, thereby decreasing the brightness of the LCD device. At this point, it should be understood that when the LCD device includes a pluarity of back-lights, such as a plurality of LEDs (Light Emitting Diode), the data on the distribution of the pixels for the entire image that will display a monochromatic light or a mixture of two lights can be used to efficiently control the back-light for each panel area in order to futher improve the brightness of the LCD.

As so far described, in the present invention, an apparatus and method for driving a liquid crystal display device having four sub-pixels [R,G, B and W] improves the brightness by increasing an amount of back-light when the number or a distribution of the pixels 320 that display a monochromatic light (red light, green light or blue light) or a mixture of two lights out of red light, green light and blue light is, for example, greater than the reference value, It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device comprising:

a display panel having a plurality of pixels, each pixel including R, G, B and W sub-pixels;

a color information detecting unit receiving R, G and B sub-pixel video data for each pixel and outputting first and second signals, wherein the first signal is different from the second signal, and the color information detecting unit outputs the first signal when one or two of the R, G and B sub-pixel video data are null;

a color component determining unit counting the number of the first signal, comparing the number of the first signal with at least one reference value, and outputting a control signal; and a light source control unit controlling an amount of light according to the control signal.

2. The device according to claim 1, wherein the display device is a liquid crystal display device.

3. The device according to claim 1, wherein the reference value is stored in a look-up table(LUT).

4. The device according to claim 1, wherein the color information detecting unit includes an Exclusive-OR logic gate.

5. The device according to claim 4, wherein the Exclusive-OR logic gate includes a NOR gate, an OR gate and an AND gate.

6. The device according to of claim 1, wherein the color information detecting unit comprises:

a red detecting unit for detecting whether the red sub-pixel video data has a value or null;

a green detecting unit for detecting whether the green sub-pixel video data has a value or null;

a blue detecting unit for detecting whether the blue sub-pixel video data has a value or null;

a first OR gate for reversing and receiving signals outputted from the red, green and blue detecting units and for performing OR-function;

a second OR gate for receiving signals outputted from the red, green and blue detecting units and for performing OR-function; and a first AND gate for receiving the signals outputted from the first and second OR gates, performing AND-function, and outputting the first or second signals to the color component determining unit.

7. The device according to claim 1, wherein the color component determining unit comprises:

an operating unit for receiving the first or second signals from the color information detecting unit and counting the number of the first signals for an entire image; and a comparing unit for comparing the number of the first signals with at least one reference value, and outputting a control signal to the light source control unit.

8. The device according to claim 1, wherein the light source control unit carries out pulse operated by pulse width modulation (PWM) and controls an amount of light.

9. A display device comprising:

a display panel having a plurality of pixels, each pixel including R, G, B and W sub-pixels;

a color information detecting unit receiving R, G and B sub-pixel video data for each pixel and outputting a detecting signal when one or two of the R, G and B sub-pixel video data are null;

a color component determining unit receiving the detecting signals for the entire pixels, operating the detecting signals, comparing the operated detecting signals with at least one reference value, and outputting a control signal; and a light source control unit controlling an amount of light according to the control signal.

10. The device according to claim 9, wherein the reference value is stored in a look-up table(LUT).

11. The device according to claim 9, wherein the color information detecting unit includes an Exclusive-OR logic gate.

12. The device according to claim 11, wherein the Exclusive-OR logic gate includes a NOR gate, an OR gate and an AND gate.

13. The device according to claim 9, wherein the display device is a liquid crystal display device.

14. The device according to claim 9, wherein the light source includes an LED (Light Emitting Diode).

15. A method for driving a display device having a plurality of pixels, each pixel including R, G, B and W sub-pixels, the method comprising:

receiving R, G and B sub-pixel video data for each pixel and outputting a detecting signal when one or two of the R, G and B sub-pixel video data are null;

receiving the detecting signals for the entire pixels, operating the detecting signals, comparing the operated detecting signals with at least one reference value, and outputting a control signal; and controlling an amount of light according to the control signal.

16. The method according to claim 15, wherein the reference value is stored in a look-up table(LUT).

17. The method according to claim 15, wherein the display device is a liquid crystal display device.

18. The method according to claim 15, wherein the light source includes an LED (Light Emitting Diode).

19. The method according to claim 15, wherein the operating the detecting signals is counting the number of the detecting signals.

* * * * *